Aug. 26, 1952     J. M. HALL     2,608,125
COLOR DENSITY ANALYZER
Filed April 8, 1949     5 Sheets-Sheet 1
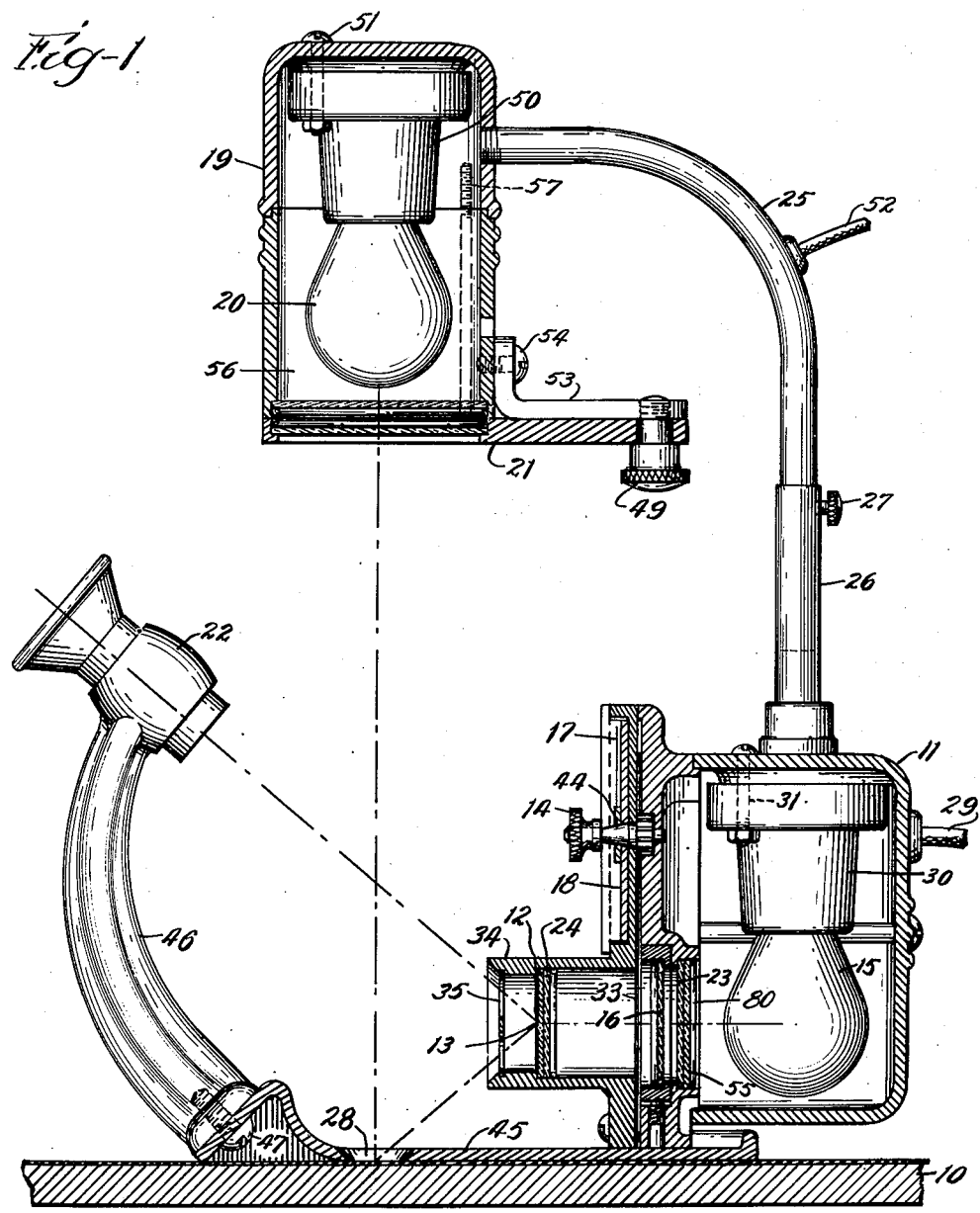
INVENTOR.
Joseph M. Hall.
BY Mann and Brown
Attys.

Aug. 26, 1952     J. M. HALL     2,608,125
COLOR DENSITY ANALYZER
Filed April 8, 1949     5 Sheets-Sheet 2
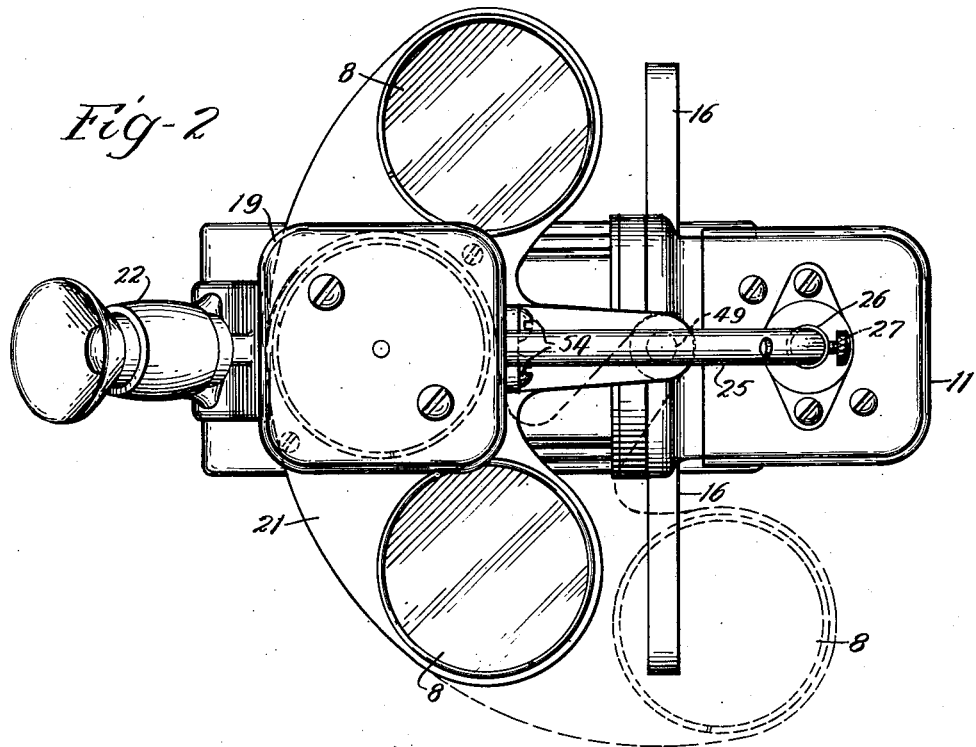
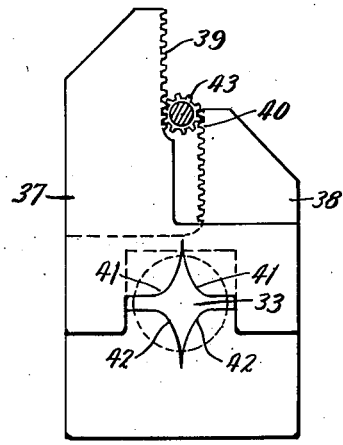
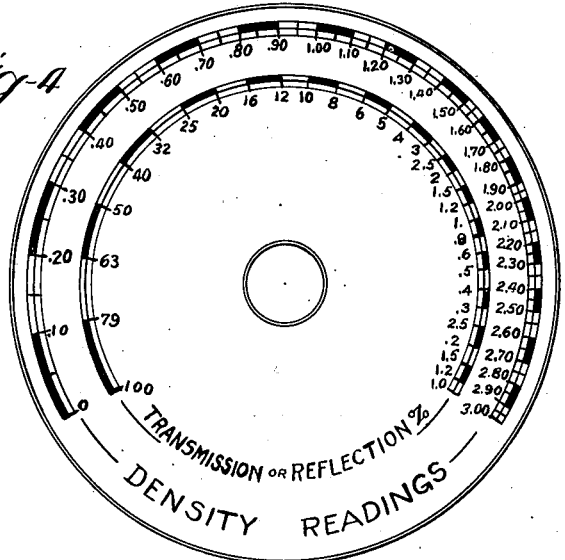
INVENTOR.
Joseph M. Hall
BY
Mann and Brown
Attys.

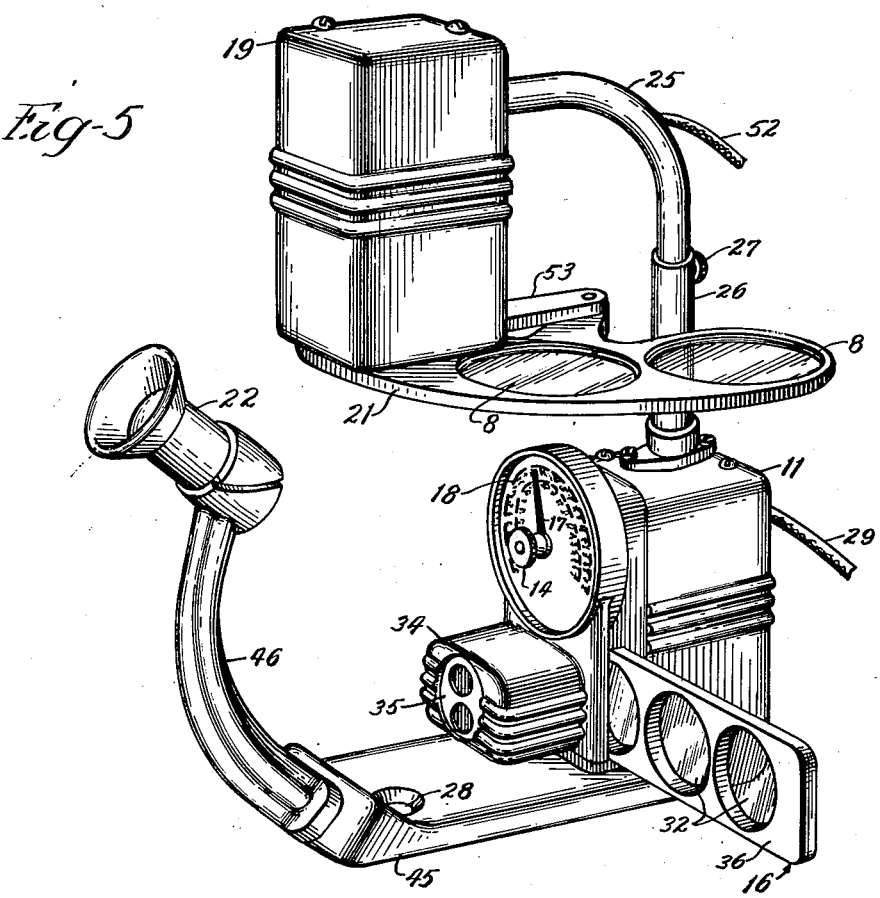
| READ THRU FILTERS | A | B | C |
|---|---|---|---|
| COLOR DENSITY | CYAN. | MAGENTA | YELLOW |
| WHITE 3200°K | 0 | 0 | 0 |
| GREY (MEDIUM) | .60 | .60 | .60 |
| BLACK | 1.30 | 1.30 | 1.30 |
| TREE GREEN | 1.10 | .80 | 1.10 |
| LIGHT GREEN | .50 | .25 | .35 |
| GRASS GREEN | .70 | .40 | .70 |
| FLESH (MAN) | .20 | .40 | .50 |
| FLESH (CHILD) | .05 | .30 | .45 |
| BLUE SKY | .35 | .20 | .05 |
| BLUE WATER | .85 | .60 | .25 |
| BRIGHT RED | .20 | 1.50 | 1.10 |
| WALNUT | 1.10 | 1.30 | 1.05 |
| MAHOGANY | 1.10 | 1.60 | 1.10 |
| CEMENT WALK | .30 | .30 | .30 |
|  | .20 | .70 | .57 |
INVENTOR.
Joseph M. Hall.
BY
Mann and Brown Aug. 26, 1952     J. M. HALL     2,608,125
COLOR DENSITY ANALYZER Filed April 8, 1949     5 Sheets-Sheet 4

Inventor
Joseph M. Hall
By: Mann and Brown
Attys.

Aug. 26, 1952   J. M. HALL   2,608,125
COLOR DENSITY ANALYZER
Filed April 8, 1949   5 Sheets-Sheet 5
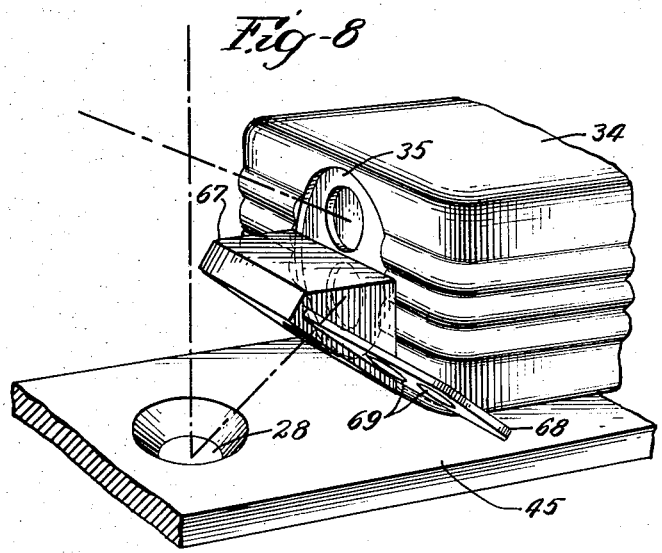
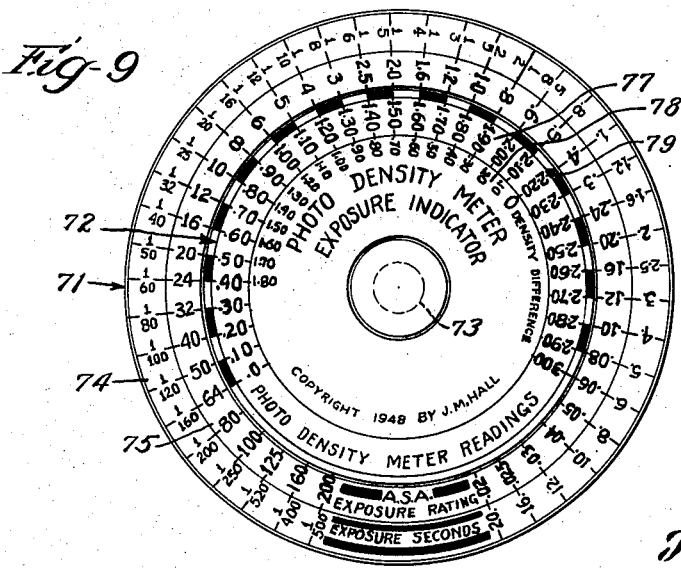
Inventor
Joseph M. Hall
By:- Mann and Brown
Attys.

Patented Aug. 26, 1952

2,608,125

UNITED STATES PATENT OFFICE 2,608,125

COLOR DENSITY ANALYZER

Joseph M. Hall, Chicago, Ill.

Application April 8, 1949, Serial No. 86,340

16 Claims. (Cl. 88—14)

The principal object of the present invention is to provide a method and apparatus for measuring the amount of light reflected from a given surface or transmitted through a transparency, and is particularly suitable for determining the color components and densities of colored surfaces and transparencies, including surfaces to which a colored image is projected, as in the field of color photography.

It will be apparent at once that the possible uses of such a method and apparatus are extremely wide and varied. For example, it may be used in analyzing the color values of paints, inks, dyes, and the like, so that a previously colored surface, or a particular paint, ink, or dye, may be precisely duplicated.

The invention is particularly useful in the field of color photography for accurately and rapidly producing well balanced color prints. Due to the variance in conditions under which color transparencies are taken it is not always possible to faithfully reproduce the colors of the photographed object and/or to obtain the most satisfactory reproduction of the object.

In making positive color prints from improperly balanced color transparencies it is possible, at least in some measure, to neutralize an excess of one color in the transparency by interposing suitable color filters between the light source and the print paper. At the present time the determination of the proper color filter to use is largely determined by cut-and-try methods. Through the use of my invention it is possible to obtain the projected color values at the surface upon which the sensitized paper is to be placed for making the enlarged color print. Thus the photographer is able to correct with the use of proper filters, the color spectrum of the light source used in making the color print, so that the print has the desired balance of colors.

In general, these and other objects are obtained by balancing the light from two standardized sources by means of a balanced light type of photometer, subtracting from the light projected to the photometer screen from one of said sources an amount representing the color value of a given color found in the surface or transparency being analyzed and determining the amount of light which is necessary to rebalance the photometer. A novel reflective photometer is used which permits almost any type of surface to be studied, and has the advantage, in the field of photography, of permitting direct analysis of any portion of a projected image while projected on the easel which supports the print paper. More specifically, the photometer is characterized by the fact that the virtual position of the face of the photometer is at the surface being analyzed.

Additional objects and advantages, together with details of the method and apparatus, will be apparent from the following description taken in conjunction with the drawings, in which Fig. 1 is a side elevation of a preferred device for practicing my invention;

Fig. 2 is a top view of part of the device shown in Fig. 1;

Fig. 3 is a rear elevation of a variable orifice means used in connection with the device shown in Fig. 1;

Fig. 4 shows a calibrated scale dial used in connection with the device of Fig. 1 for obtaining density readings;

Fig. 5 is a perspective view of the device shown in Fig. 1;

Fig. 6 is a chart showing color combination densities obtained with the device of this invention;

Fig. 8 is a perspective view of a portion of the front of the analyzer illustrating another embodiment; and Fig. 9 is a plan view of an exposure computer for use with the density meter in making color prints.

Figure 7:
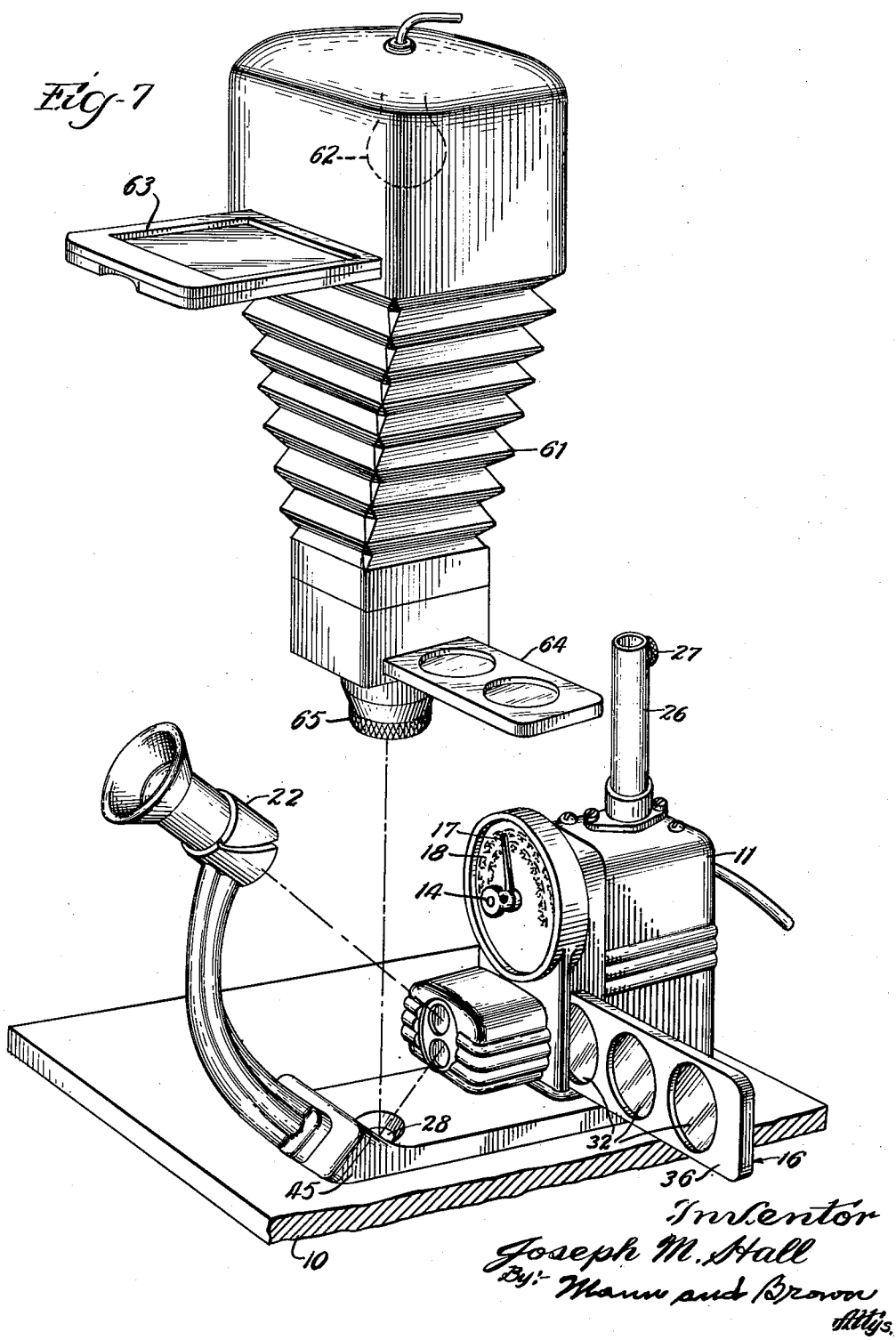
Fig. 7 is a perspective view of the analyzer being used with an enlarger to obtain the color densities of a transparency.

As illustrated in Figs. 1 through 5 inclusive, the embodiment is adapted for use in measuring the color values of a surface which is colored by a pigment, dye or the like. For the purposes of illustration the surface will be described as a sheet of colored paper, but it will be apparent that the method and apparatus is equally applicable to a wide variety of other objects. The device is positioned on a suitable supporting surface or easel 10 with the material to be studied between the device and the easel.

In general, the principal parts of the device shown in Fig. 1 include a densitometer casing 11; a reflective densitometer face including an outwardly facing mirror 12 that is built into the casing 11 as a wall portion thereof, and which has a small light transmitting spot 13 within its reflecting area; a light source 15 for back-lighting the spot 13; a diffusion glass 23; a conversion filter 55 for correcting the color temperature of the light source 15 to substantially 3200° K.; a filter slide 16 for interposing color separation filters between the light source 15 and the light transmitting spot 13; diaphragm means adjustable by a knurled knob 14 for controlling the illumination of the light transmitting spot 13; a means to indicate the effect of the illumination of the light transmitting spot 13 in terms of density, such means comprising a pointer 17 operatively connected to knob 14 and a dial 18 under the pointer carrying a suitable scale; a second diffusion glass 24 adjacent mirror 12; a lamp housing 19 containing a light source 20; a conversion filter 56 for correcting the color temperature of the light from light source 20 to substantially 3200° K.; a filter head 21 for interposing color filters between the light source 20 and the colored surface to be illuminated; and an eye piece 22 focusable on the light transmitting spot 13 in the mirror 12 for observing the color relationship between the spot 13 and the mirror area immediately surrounding the spot. The lamp housing 19 is removably connected to the densitometer casing 11 by means of an arm 25 telescopically receivable into tube 26, the lamp housing 19 being vertically positionable with respect to the densitometer casing 11 by means of the knurled head set-screw 27.

A light source including lamp 15 in the densitometer casing 11 is controlled by a switch (not shown) and energized by power supplied through a light cord 29. As shown, the lamp 15 is held in a downward position, and the lamp socket 30 is secured to the densitometer casing 11 by suitable means, such as by a bolt 31. The inner diffusion glass 23 and the conversion filter 55 are maintained in position by a retaining ring 80. The filter slide 16 is provided with apertures 32 for holding separation filters as desired. As best shown in Fig. 5, the filter slide 16 consists preferably of a panel 36 having a plurality of circular apertures 32 for receiving and holding color filters. Each of these apertures 32 is of substantially the same diameter as the light passage, and may be positioned selectively in registration therewith. As shown in Fig. 1, the filter slide 16 is preferably positioned in a receiving slot between the conversion filter 55 and the calibrated and adjustable aperture 33 for light control.

While the intensity of the light that reaches the light transmitting spot 13 from the lamp 15 in the densitometer casing 11 may be varied by any suitable means such as a gray scale or the like, I preferably employ a variable orifice in the path of the light from the lamp 15. As best shown in Fig. 3, the diaphragm means forming the variable orifice comprises a rearward plate 37 and a forward plate 38 in overlapping relation. The rearward plate 37 has a rack portion 39 and two reentrant edges 41 conforming to logarithmic curves and positioned to form the upper half of a variable orifice. The forward plate 38 has an upper rack portion 40 and two curved edges 42 positioned to form the lower half of the orifice. The two rack portions 39 and 40 of the plates 37 and 38 are engaged by a pinion 43 on a stub shaft 44 that carries an adjustment knob 14 whereby rotation of the knob in a counter-clockwise direction (as viewed from the front) will increase the area of the orifice 33, and rotation of the knob in a clockwise direction will decrease this area.

The dial 18 which is shown in Fig. 4 is faced with suitable scales for the measurements that are to be made. For example, the well known logarithmic scale of photographic density values may be used. The scales are traversed by a pointer 17 mounted on the stub shaft 44, the scales and the pointer 17 being calibrated with the illumination varying effect of the variable orifice means.

An extension of the densitometer casing 11 forms a partial light shield 34 for the mirror 12 for eliminating extraneous rays of light. In addition to this means of eliminating undesirable light rays there is provided an apertured disc 35 through which passes the reflected light from the material to be analyzed positioned at 28, as well as light from the light transmitting spot 13. The mirror 12 forming the densitometer face may be silvered on either of its surfaces for light reflection, and the light transmitting spot may conveniently have a diameter of the order of one thirty-second of an inch.

The eye piece 22 previously mentioned is rigidly connected to the base plate 45 by means of an arm 46, the arm being secured to the plate by means of a screw 47, as shown.

Positioned vertically with respect to the densitometer casing 11 is a lamp housing 19, removably connected to the top of the densitometer casing 11 by means of the connecting arm 25, and whose position is controlled by a knurled head set-screw 27 positioned on the arm-receiving tube 26. The lamp housing 19 is preferably formed in two parts and held together by a screw 57. The lamp 20 within the housing 19 is held downwardly, and the lamp socket 50 is secured to the housing by means of a bolt 51. The lamp is energized by power supplied through a cord 52. A conversion filter 56 for correcting the color temperature of the light is positioned between the lamp 20 and the filter head 21, as shown in Fig. 1.

The filter head 21, best shown in Figs. 2 and 5, is connected to the lamp housing 19 by means of a plate 53. The plate 53 is secured to a side of the lamp housing 19 by means of a screw 54. As shown in Fig. 2, the apertured portion of the filter head is rotatable about an axis formed by the knurled head screw 49 so as to interpose the color filters between the light source 20 and the material to be analyzed when illuminated by light source 20.

As stated heretofore, the basic concept of the present invention consists in being able to analyze a colored object and determine the densities of the color components thereof. In applying this concept to the device embodied in my invention three types of color filters are used. These are: an A filter containing equal densities of magenta and yellow; a B filter having equal densities of cyan and yellow; and a C5 filter containing equal densities of magenta and cyan. For the purpose of this application, the colors magenta, yellow and cyan will be deemed primary colors.

The operation of analyzing the color values of a surface such as a sheet of paper, for example, to determine the densities of its component colors is performed as follows:

(1) Both light sources are turned on, all filters with the exception of filters 55 and 56 to standardize color temperature are moved out of the way, and knob 14 is rotated counter-clockwise until the pointer 17 is at the zero density end of the dial. At this point aperture 33 is open the maximum amount. A sheet of 3200° K. white paper, hereinafter referred to merely as a "white paper" or a "white surface," is placed on the easel immediately below aperture 28, set-screw 27 is loosened, and the instrument is balanced by raising or lowering lamp housing 19 until the light transmitting spot 13 in the mirror 12 disappears when viewed through eye piece 22. The set-screw 27 is then retightened, locking lamp housing 19 in place. It is important to appreciate that at this balance (i. e., with 3200° K. balanced light sources and a 3200° K. reflective surface), the densities of cyan, magenta and yellow are equal and are in each instance zero on the instrument which establishes the lower range on the density scale.

(2) An A filter is interposed between the light source 20 and aperture 28 (hereinafter, for convenience, called the first beam, which term shall be understood to include the beam reflected to the face of the photometer screen) by a suitable movement of holder 21, and an identical filter is interposed between light source 15 and mirror 12 (hereinafter, for convenience, called the second beam) by means of suitable movement of filter holder 16. If the paper used was 3200° K. white paper, the instrument should still be in balance, i. e., the light transmitting spot 13 should not be apparent in mirror 12. The interposition of the A filter in both beams of light does not disturb the photometric balance, because the light source and the reflective surface each have equal densities of magenta and yellow, just as the A filters have like densities of these two primary colors. If it is known that the paper being used is white, the step of balancing, outlined under heading (1) above, may be performed with two identical filters interposed between the respective light sources. Although the initial balancing is preferably performed with a white surface below aperture 28, obviously other standards may be adopted if desired, provided the instrument is suitably calibrated to such standard.

The colored paper to be analyzed is now placed on the easel immediately below aperture 28, with the white paper previously used either being removed or left under the colored paper. If an object, the surface of which was to be studied, was utilized as the support in place of easel 10, with a piece of white paper laid over it to obtain a light balance, the present step merely involves the removal of the white paper.

(3) The knurled knob 14 is rotated in a clockwise direction, thereby closing aperture 33 until the light transmitting spot 13 disappears as viewed through eye piece 22. The indicated density is then read off the calibrated scale on dial 18 with both A filters in place. Assuming that this reading is, for example, .30, it indicates that the surface being analyzed has a density of .30 cyan, since the A filters do not pass cyan light up to their rated capacities. In other words, when the colored surface was substituted for the 3200° K. reflecting surface, the reflection of the downwardly projected beam was decreased by an amount represented on scale 18 as .30, and this decrease in reflection (or increase in density) was caused solely by the presence of .30 cyan in the colored surface. The magenta and yellow colors transmitted by the A filter in the first beam are exactly compensated by these same colors transmitted through the A filters in the second beam, and hence balance out and do not affect the scale reading. Only the cyan in the colored surface can affect the scale reading when the A filters are in both beams, since the A filters are cyan impervious (up to their rated capacities) or, as sometimes stated, are "minus cyan."

(4) Both A filters are now replaced by B filters, and the knurled knob 14 is again adjusted to render light transmitting spot 13 invisible. Assuming that the reading on the calibrated density scale is .10, it indicates that the sample has a density of .10 magenta, since the B filters do not transmit magenta up to their rated capacities. Again the equal densities of the primary colors transmitted by the B filters cancel out, and it is the magenta in the colored surface that is measured (by subtraction) through the rebalancing of the photometer.

(5) The B filters are replaced by C5 filters and the operation repeated. Assuming that a scale reading of .20 is obtained, it indicates that the sample has a density of .20 yellow, because the C5 filters do not transmit yellow up to their rated capacities. Here the C5 filters hold back yellow light from the colored surface being tested, and hence the decreased reflection, or increased density, noted on the scale 18 when the photometer is rebalanced, must be due to the yellow in the specimen surface.

The density scale illustrated is also particularly suited for use in analyzing the color values of photographic transparencies, as will be more fully explained subsequently. When the instrument is to be used for other specific purposes, it will be found desirable to utilize scales which will give a reading in terms of the subject-matter under consideration and indicate directly the required information for subsequent operations on that material.

Briefly, the operation of the analyzer whether used for analyzing colored surfaces or transparencies is based upon the subtraction of light (because of the presence of a particular color) from a predetermined or standard value, the amount of the subtraction being indicative of the density of a particular color present in the surface or object being analyzed. Two light paths are created to the face of the reflective balanced light type photometers, one path being from the upper light source 20 to the surface immediately under aperture 28, and thence to the mirrored face of the photometer, and the other from the light source 15 to the spot 13 on the face of the photometer. A suitable adjustment is made to render equal the light on the face of the photometer from each of these paths. In the specific embodiment illustrated (see Figs. 1–5), this is done by adjusting the length of the first-mentioned path, but other methods might be used, such as employing an adjustable diaphragm or gray scale in front of light source 20 (as, for example, in Fig. 7) or by similar means used in connection with light source 15.

The surface of the object to be analyzed is interposed in the first of said two paths by placing said surface in the plane immediately below aperture 28, whereby to the extent that the surface includes the color which has been subtracted from the light emanating from the upper light source (by means of filters in holder 21) a loss in the amount of light transmitted to the reflective face of the photometer is obtained.

For example, with an A filter interposed in front of both light sources, the light emanating from those filters is magenta and yellow and contains no cyan light (up to the rated capacities of the filters). If this emanating light strikes a surface having only a magenta and yellow coloring of the same density of the A filters, the density reading on the scale would be zero, indicating no cyan in the object being tested. If, however, this emanating light (containing no cyan) strikes a surface containing cyan, the density reading on the scale will indicate the density of the cyan only, since the magenta and yellow components of the two beams cancel out and have zero density by definition.

If a white light containing the primary colors strikes a surface which is spoken of as "colored," the light rays of certain wave lengths will be reflected, and rays of certain wave lengths will be absorbed. The maintenance of a certain color temperature of the light insures that the light will contain certain proportions of light of various wave lengths, and 3200° K. is the standard generally used in photographic work, because at this temperature the density of the magenta, cyan and yellow are substantially equal.

When a B filter is used, the light emanating from the filter contains no magenta, and upon striking a surface containing magenta, the instrument will indicate the density of the magenta only, since the yellow and cyan components of the B filters are balanced to zero density by the interposition of such filters in both beams. Likewise with C5 filters the color yellow is subtracted from the light emanating therefrom (up to the rated capacity of the filters), and the amount of yellow in the surface coloration will be indicated by an increased density reading equal to the density of the yellow in the surface, since the magneta and cyan in the first beam are balanced out by the corresponding C5 filter in the other beam. In each instance the amount of loss in reflected light is balanced by closing aperture 33 to reduce the amount of light reaching spot 13 from light source 15. The amount of reduction that must be made in the lighting of the light transmitting spot 13 is indicative of the loss in reflection from the surface below aperture 28 and, thus, indicative of the amount of color present in the surface below aperture 28.

From the foregoing description certain modifications will be apparent to those skilled in the art. For example, the calibrated diaphragm opening 33 might be placed in front of light source 20 and the initial balance (previously enumerated step (1)) obtained with the diaphragm opening substantially closed. Identical filters would then be placed in front of both light sources, and the colored surface to be analyzed placed in the plane immediately below aperture 28 (previously enumerated step (2)). The measurement in the reduction of the lighting on the portion of the face of the photometer immediately surrounding the spot would be made by increasing the opening of the diaphragm (in front of light source 20) until sufficient light had been added to make up for the loss resulting from the color in the surface being analyzed, which increase would be a function of the amount of the particular color in that surface. A suitably calibrated scale would be provided in conjunction with the diaphragm opening mechanism to give readings of the amount of light that has been added, and hence the amount of color present in the surface. The scale could be substantially the same as that shown in Fig. 4, except that the 100 per cent reflection, zero density, end of the scale would indicate that the diaphragm opening 33 was of a minimum size rather than a maximum size as in the illustrated embodiment.

The method and apparatus used in analyzing transparencies is substantially the same in theory but varies somewhat in actual application. The same analyzing instrument, as described with regard to Figs. 1 through 5, may be used, but the upper light source 20 is removed by loosening thumb screw 27 and detaching arm 25 from tube 26. The analyzer is used in conjunction with a conventional enlarger, generally 61, which serves as a projector, with the base 45 of the analyzer resting upon the enlarging easel 10, as shown in Fig. 7. The enlarger includes a suitable light source such as bulb 62; preferably the type of bulb is corrected to maintain a color temperature of 3200° K. A negative holder 63 is included in the enlarger in a conventional manner, and a filter holder such as slide 64 is also provided. If desired, other types of filter holders may be used, such as that illustrated at 21 in Fig. 5. The enlarger also includes a lens system mounted in holder 65 and a suitable adjustable diaphragm in the lens holder to vary the amount of light emanating from the projector.

The procedure in analyzing a color transparency follows the same general pattern as that used in analyzing colored surfaces. A sheet of white 3200° K. paper is placed on easel 10 under aperture 28. Light source 62 and light source 15 are both turned on; the filters, if any, are removed (except, of course, for the color temperature filters); knob 14 is rotated so that pointer 17 is at the left-hand end of dial 18, showing zero density. The film to be analyzed is placed in the enlarger, focused, then removed. A balance is then obtained by adjusting the diaphragm opening of lens mounting 65 until the spot in the face of the photometer disappears, at which time the instrument is in balance ready for use. The film to be analyzed is then again placed in the enlarger, and the aperture 28 located over that portion of the projected picture, the color value of which is to be analyzed. Suitable pairs of filters are interposed in front of light sources 15 and 62 by moving filter holders 16 and 64 respectively. Knob 14 is rotated in a clockwise direction until a balance is again obtained between the illumination of spot 13 and the surrounding portions of mirror 12, whereupon a reading of color densities is taken from the outer scale of dial 18. As with the measurement of surface colors, if A filters are used, the density reading will be of the color cyan; if B filters are used, the density reading will be of the color magenta; and if C5 filters are used, the density reading will be of the color yellow.

As has previously been stated, the density readings (the outer scale of dial 18) have been calibrated particularly for use in analyzing color transparencies. Assuming, for example, that the three readings obtained with a given transparency were: A filter equals 0.30, B filter equals 0.10, and C5 filter equals 0.20, it would indicate the transparency had a density of 0.30 cyan, a density of 0.10 magenta, and a density of 0.20 yellow. From these figures one skilled in the art will be able to determine the filters necessary to make a pleasingly balanced positive color print.

The theory of operation of the densitometer, when used in measuring the color values of transparencies, is based upon the same subtraction process outlined in connection with measuring color values of colored surfaces. A balance is obtained between the spot and reflective surface of the photometer, using two light sources from which a specific color has been subtracted. Thus there has been created two light paths to the face of the photometer providing equal illumination thereupon, one path from the enlarger light 62 to the surface to the face and the other from the photometer light 15 to the back lighted spot. A transparency is interposed in the first of these paths, and to the extent that the said subtracted color is present in the transparency, the light transmitted therethrough will be diminished.

For example, if a pair of A filters is being used which will not transmit the color cyan (at least to the rated capacity of the filter), and a transparency is interposed which is all cyan (or to put it another way, will only transmit the color cyan), then substantially none of the light from that light source will be received at mirror 12, and the density reading will be increased by the density of the cyan. To the extent that a smaller amount of cyan is present in the transparency, more light will be passed therethrough and received at mirror 12, thereby giving smaller density readings. As far as the theory or operation is concerned, it makes no difference whether the transparency is positioned adjacent the light source with the filter below the transparency, as illustrated in Fig. 7, or whether the filter is positioned on top with the transparency below it.

If it should be desired to measure the color values of a surface which has been colored by means of projected light, such as the projected image of a transparency on an easel, while at the same time being able to view the colored image on the easel without any of the colors having been subtracted therefrom, it may be done by means of a variation of the procedure previously outlined for transparency. The initial balance may be obtained in the same manner by using a color temperature corrected white 3200° K. light and with the filters in holders 16 and 64 and the transparency in holder 63 removed from the light paths. After the balance is obtained, the transparency is moved in front of light source 62 by means of negative holder 63; and suitable pairs of filters are inserted in the two light paths leading to the face of the photometer, the variation in procedure being that instead of inserting the filter in the portion of the first light path (that path from projector light source to the plane at the base of aperture 28 and thence to the face of the photometer) between the projector light source and the plane at the base of aperture 28, such as is illustrated in Fig. 7, the filter is inserted in the portion of the same path between the plane at the base of aperture 28 and the face of the photometer.

Fig. 8 illustrates an embodiment of the invention by which this may be performed. A mounting 67 is provided on the front of shield case 34, which mounting is adapted to receive a filter slide 68 having suitable aperture 69 in which the filters are mounted. The mounting and slide permit the filters to be positioned in the portion of the light path between the surface at the base of aperture 28 and the face of the photometer.

By this method the portion of the image seen in the plane at the base of aperture 28 can be viewed with its full coloration (except through eye-piece 22). However, whatever light is reflected from the plane at the base of aperture 28, which is of the color to be subtracted by the particular pair of filters, will be removed from the light reaching the face of the photometer, giving the same subtracted result as with the previously discussed methods.

For example, if the cyan density in a transparency is to be measured, an A filter will be inserted in the second light path between light source 15 and the photometer spot by means of holder 16, and an A filter will also be inserted, by means of holder 68, in the portion of the first light path between the plane at the base of aperture 28 and the reflective face of the photometer. To the extent that cyan light from the transparency is projected to said plane and reflected therefrom, it will be subtracted by the A filter in holder 68 before it reaches the face of the photometer with a corresponding decrease in the amount of light on the reflective portion of the photometer face. As in the previous methods, knob 14 will be rotated to decrease the amount of light from source 15 to the photometer spot, the amount of such decrease being read on the suitable scale of dial 18, thus indicating the density of the subtracted color.

When making color prints from color transparencies, or when making black and white prints, separation negatives, etc., the density analyzer may be used to compute the correct exposure times as well as used to determine density values for the different portions of the negative and the required color correction filters necessary, in the case of color work, for a pleasingly balanced print. For this purpose it is necessary that the light source 15 in the photometer be standardized not only as to Kelvin temperature, but also as to intensity, and suitable calibration means be available. In its preferred form the calibration means is a "circular slide rule" type computer, such as is illustrated in Fig. 9.

The computer consists of an outer circular dial, generally 71, and an inner circular dial, generally 72. The two dials are concentrically mounted on pivot pin 73, and at least one of the dials is rotatable with respect to the pin whereby the two dials may be rotated with respect to each other.

The outer dial 71 has two scales thereupon, the outer scale 74 being the exposure time in seconds and the inner dial 75 being a series of exposure ratings to cover the emulsion speeds of the various types of paper upon which prints may be made. The inner dial 72 also includes two scales, the outer scale 77 being a density reading scale corresponding to that appearing on dial 18 of Fig. 4, and the inner scale 78 being the density-difference scale. The standard to which the exposures are calibrated is determined by the intensity of the light source in the enlarger, and for practical reasons a density reading of 2.20 is selected as the value to use for the least illuminated area on the projection easel (the area corresponding to the portion of the transparency that is the most dense). For this reason a heavy arrow 79 is placed on the inner dial 72 opposite the density reading 2.20.

The following is a description of the use of the density analyzer and exposure indicator in making color prints from color transparencies. The density analyzer is set up as in Fig. 7, and an analysis is made of the color components of the transparency. Normally this is done with the aperture 28 positioned over the most prominent portion of the projected image from the transparency, or the most prominent portion of that part of the projected image from which a print is to be made. Assuming that this portion of the image is supposed to be white or slightly gray, and that by actual color analysis with the density analyzer, it was found, as in the previously discussed example, that this portion of the transparency had a density of 0.30 cyan, 0.10 magenta and 0.20 yellow, it would indicate that in making the print it was desirable to use additional filters having a density of 0.20 magenta and 0.10 yellow to obtain a balanced color density (the total density of the transparency and filters then being 0.30 cyan, 0.30 magenta and 0.30 yellow), which would be a light gray.

If, instead of selecting a white or gray portion of the picture for color correction, some other prominent feature were chosen, as, for example, a person's face, green grass or the blue sky, it is possible by referring to the chart in Fig. 6 to ascertain the color balance needed to obtain true color values, and the necessary corrective filters may be applied to provide the desired balance. Hence, if the green for grass in a transparency analyzes as .50 cyan, .50 magenta and .70 yellow, it would be apparent by referring to Fig. 6 that by applying corrective filters to add .30 cyan and .10 yellow to the projection light, the cyan and yellow densities would be equal and the magenta .30 density lower to give the desired ratio of colored densities.

With these additional filters mounted between the enlarger and the easel in a suitable holder (not shown) the operator is then ready to determine the correct exposure times for the type of printing paper which he plans to use. This may be done either with the enlarger diaphragm in lens holder 65 in a wide open position, or the diaphragm may be closed to the approximate point at which the operator believes a correct exposure will be obtained.

The base 45 of the density meter is moved until aperture 28 is positioned over the darkest area of the projected image, and knob 14 is rotated until spot 13 disappears as viewed through eye piece 22. The dark area density reading is then obtained from dial 18, which, by way of example, is assumed to be 2.40. Base plate 45 is then moved until aperture 28 is moved over to the lightest portion of the projected image, and knob 14 is again rotated until spot 13 disappears. From the density scale on dial 18 the bright area reading is obtained, which, by way of example, is assumed to be 1.30. This gives a density difference of 1.10

Referring now to Fig. 9, it is assumed, for the purposes of the example, that the paper upon which the color print is to be made has an A. S. A. rating of 0.4 The outer dial 71 and the inner dial 72 are now rotated with respect to each other until the arrow 79, adjacent density reading 2.20, is aligned with the figure 0.4 on the A. S. A. exposure rating scale 75. The correct exposure time is now found on scale 74 opposite the dark area reading just obtained. It must be remembered that the dark area density reading is always used unless a density difference correction is made, as hereinafter explained, in which case the bright area density reading may be used.

The dark area density reading having been 2.40, it will be noted that the correct exposure time is 1.6 seconds, which is the number on scale 74 opposite the figure 2.40 on scale 77. If the dark area density reading had been 2.00, the exposure time would be ⅝ of a second; and if the dark area density had been 1.60, the exposure time would be ¼ of a second, etc.

In some instances it may be desirable to use the bright area density reading as a basis for computing exposure time. This might be desirable when a print is to be made from a very dense negative or when the correction filters inserted have been of quite large rated values so that the light striking the easel is relatively small, or when it may have been necessary to close the diaphragm in lense holder 65 to a considerable extent in order that an accurate focus is obtained over the whole of the area to be printed, thus reducing the light striking the easel. In such instances it may be much easier to obtain an accurate balance in the bright area than in the dark area.

Assuming that such conditions exit, the preferred procedure is to open the enlarger diaphragm the maximum amount and obtain the dark area and bright area density readings, as heretofore explained, which are assumed (for example) to be 2.40 and 1.30 respectively, with a density difference of 1.10. The enlarger diaphragm is now closed down until a sufficiently accurate focus is obtained over the whole of the projected image to be printed, and a new bright area density reading is obtained which is assumed to be 1.80.

Since the bright area density reading is to be used to obtain the exposure time, a density difference correction by means of scale 78 must be made. Assuming that the paper to be used for printing has a standard A. S. A. exposure rating of 5, dial 71 and dial 72 are rotated with respect to each other until the density difference of 1.10 on scale 78 is opposite the A. S. A. exposure rating of 5 on scale 75, as indicated in Fig. 9. The correct exposure is now found on scale 74 opposite the bright area density reading on scale 77. It will be seen that for a bright area density reading of 1.80, the proper exposure time is ⅖ of a second.

The same readings should have been obtained if the dark area density reading had been used after the diaphrgam had been closed down, but it may have been considerably more difficult to obtain a balance when the dark area density reading was sought. With a density difference of 1.10 and a bright area density reading (after the diaphragm was closed) of 1.80, the dark area density reading at that time (had it been obtained) should have been 2.90. If the arrow 79 were set opposite the A. S. A. exposure rating of 5 on scale 75, it would be found that the density reading of 2.90 on scale 77 would be opposite ⅖ of a second on scale 74.

From the foregoing description it will be seen that the density analyzer is extremely versatile. It not only may be used to obtain the density values of a colored surface, whether colored by projected light or pigments, dyes, or the like and as a basis for obtaining the correct colored filters for producing balanced color prints, but it also may be used to obtain the proper exposure time for those color prints.

This application is a continuation-in-part of my copending application, Serial No. 23,021, filed April 24, 1948, now abandoned, and application Serial No. 566,431, filed December 4, 1944, now issued as Patent No. 2,440,266, the disclosure of each of which is specifically incorporated herein by reference.

I claim:

1. In a device of the character described, a first light source adapted to provide a light beam having a given color temperature, means for interposing color filters between said light source and an object whose color densities are to be determined, a mirror positioned to one side of the light beam and constructed and arranged to receive light reflected from said object and to reflect it to an observer's eye, said mirror having a light-transmitting spot within its reflecting area, a second light source to illuminate said spot from behind said mirror, said second light source providing a light beam having the same color temperature as the first said light source, means for interposing color filters between said second light source and said mirror, means comprising at least one movable member positioned in a plane intersecting the light beam from said second light source to said spot, said means defining an aperture for controlling the illumination of said spot whereby the illumination of the spot may be matched with the light originating in the first said light source and reflected by the area of the mirror adjacent the spot, said aperture having at least one edge conforming to a logarithmic curve so that relative movement of said member in arithmetical progression will vary the area of said aperture in geometrical progression for varying the illumination of said spot, and means to indicate the relative position of said member in terms of light value.

2. In a device for determining densities of component colors in an object, a first light source providing a light beam for illuminating the object, said light source being corrected to a given color temperature, means for interposing color filters in the path of said beam between said light source and said object to be illuminated, a base adapted to rest upon a substantially horizontal surface in a position extending in opposite directions from said beam, said base being of open construction to leave unmasked the light beam illuminating the object to be analyzed, a casing mounted on said base and positioned so that it lies on one side of said light beam, a mirror containing a light-transmitting spot therein and serving as a wall of said casing with its reflecting face directed toward said beam from said one side of the beam, said mirror having its reflecting surface in a substantially vertical plane to direct upwardly by reflection light from the illuminated object on a line of sight toward the opposite side of the beam, a second light source corrected to the same color temperature as the first light source and adapted to illuminate said light-transmitting spot from the rear, means for interposing color filters between said second light source and said spot, a viewing lens, and means mounted on said base to hold said viewing lens on said line of sight on said opposite side of the beam.

3. A device for determining the densities of primary colors comprising a first light source for illuminating an object whose component color densities are to be determined, said light source providing a light beam of a given color temperature, means for interposing color filters between said first light source and the object undergoing analysis, a second light source housed within a casing and providing a light beam of the same color temperature as the first said light beam, an outwardly facing mirror serving as an upright wall of said casing, means for interposing color filters between said second light source and said mirror, said mirror having a light transmitting spot on its reflecting area and being positioned with its reflecting face substantially parallel to said first named beam to direct to the observer's eye, by reflection, light from the said object, variable means within said casing to illuminate the said spot from behind with known light intensities for matching light from said object, a viewing lens spaced from said casing, and means fixedly connecting said lens with said casing for holding said viewing lens on the observer's line of sight.

4. In a device for determining densities of primary colors and color combinations, an upper casing, a light source within said casing adapted to cast a light beam downwardly on an object whose component color densities are to be determined, said light beam having a given color temperature, means for interposing color filters between said light source and said object, a lower casing, said upper casing being adjustably secured to the lower casing for relative vertical movement, an outwardly facing mirror serving as an upright wall of the lower casing and having a light transmitting spot on its reflecting area, a light source within said lower casing to provide a light beam for illuminating said spot from behind, said last mentioned light beam having the same color temperature as the first said light beam, means for interposing color filters between the last said light source and said mirror, and variable means within said lower casing to illuminate said spot to known light intensities.

5. In a device for determining the densities of primary colors in an object, an upper casing, a light source within said casing adapted to cast a light beam having a given color temperature downwardly on an object whose component color densities are to be measured, said light source being vertically movable with respect to said object, means for interposing color filters between said light source and said object, a lower casing, said upper casing being adjustably secured to the lower casing for relative vertical movement, an outwardly facing mirror serving as an upright wall of said lower casing and having a light transmitting spot on its reflecting area, a light source within said second casing to provide a light beam for illuminating said spot from behind, said last mentioned light beam having the same color temperature as the first said light beam, means for interposing color filters between the last said light source and said mirror, and variable means within said lower casing to illuminate said spot to known light intensities.

6. A device for determining the densities of component primary colors in a mixture thereof comprising a first light source for producing light of a given color temperature and adapted to cast a light beam on an object whose component color densities are to be determined, means for interposing color filters between said light source and said object, a second light source for producing light of the same color temperature as the first said light source, a mirror having a light transmitting spot on its reflecting area and positioned with respect to the object whose color densities are to be determined and said second light source, so that a light beam from the second light source strikes said light transmitting spot on one side, and light emanating from said first light source and reflected from said object whose color densities are being determined strikes the mirror on the opposite side, means for interposing color filters between said second light source and said mirror, and variable means to control the amount of light going from said second light source to said light transmitting spot.

7. A device for determining the densities of primary colors in an object whose color consists of a mixture thereof, comprising a first light source adapted to illuminate the object being analyzed, means for interposing color filters between said light source and said object, means for converting the light from said light source to light of a given color temperature, a mirror for reflecting light from said object, said mirror having a light transmitting spot on its reflecting area, a second light source for illuminating said light transmitting spot from behind, means for interposing color filters between said light source and said light transmitting spot, means for converting the light from said second light source to light having the same color temperature as the converted light from said first light source, and variable means for illuminating said spot to known light intensities.

8. The device of claim 7 where the given color temperature of the light is substantially 3200° K.

9. The method of determining the density of a component primary color present in a colored object which consists in directing a first beam of light having a given color temperature onto the object, placing a color filter containing equal densities of the other two primary colors in the path of said light prior to reaching said object, positioning a photometric screen adjacent to and above the object and in the path of light reflected from the object, projecting toward said screen for photometric comparison a second beam of light having substantially the same color temperature as the first beam, placing a color filter containing equal densities of said other two primary colors in the path of the projected light prior to reaching said screen, and then varying the intensity of said corrected and filtered projected light until the intesity of said projected light matches that of said reflected light to thereby obtain the component density of said first mentioned primary color in said colored object.

10. The method as set forth in claim 9 in which the color temperature is substantially 3200° K.

11. The method of determining photometrically the density of one of a plurality of primary colors present in a colored object by the use of balanced light beams that have been standardized to the same known spectral distribution of energy, which consists in directing one of said beams onto the object, positioning a photometric screen adjacent to and above the object and in the path of light from said one beam reflected from said object, projecting the second of said beams toward said screen for photometric comparison with said reflected light, removing from the light reaching the screen from the first beam the primary color the density of which in the object is sought to be determined, removing from the light reaching the screen from said second beam the same primary color, then varying the amount of light permitted to fall on the screen from one of said beams to bring the illuminance from both beams into photometric balance, and measuring the change in illuminance required to effect such balance.

12. The of determining photometrically the density of one of a plurality of primary colors present in a colored transparency by the use of balanced light beams that have been standardized to the same known spectral distribution of energy, which consists in directing one of said beams through said transparency onto a surface, positioning a photometric screen adjacent to and above the surface and in the path of light from said one beam reflected from said surface, projecting the second of said beams toward said screen for photometric comparison with said reflected light, removing from the light reaching the screen from the first beam the primary color the density of which in the transparency is sought to be determined, removing from the light reaching the screen from said second beam the same primary color, then varying the amount of light permitted to fall on the screen from one of said beams to bring illuminance from both beams into photometric balance and measuring the change in illuminance required to effect such balance.

13. Apparatus for determining photometrically the density of one of a plurality of primary colors present in a colored surface by the use of balanced light beams that have been standardized to the same known spectral distribution of energy, said apparatus comprising a densitometer casing positioned adjacent to and above said surface and having an opening in its front wall, a photometric screen in said opening including a light-transmitting spot and a forwardly-facing mirror adjacent to the spot, a light projection housing mounted above the densitometer casing and having an opening in its lower wall, light means for projecting a first beam of light downwardly from said housing to said surface from whence it is reflected to the front face of said photometric screen, and for projecting a second beam of light to the rear face of said photometric screen, means for adjusting said two beams of light to the same color temperature, means for subtracting given spectral bands of light from the light in each of said beams, and calibrated means for varying the amount of light permitted to fall on said screen from one of said beams, whereby the beams may be brought into photometric balance.

14. Apparatus as set forth in claim 13 in which the light projection housing is mounted on the densitometer casing and is vertically adjustable relative thereto.

15. Apparatus as set forth in claim 13 in which the light projection housing comprises an enlarger having a transparency holder and a lens for projecting the image of the transparency to said surface.

16. Apparatus as set forth in claim 13 in which the calibrated means for varying the amount of light permitted to fall on the photometric screen from one beam comprises a variable light-transmitting orifice.

JOSEPH M. HALL.

REFERENCES CITED

The following references are of record in the file of this patent:

UNITED STATES PATENTS

| Number | Name | Date |
|---|---|---|
| 1,958,679 | Reiss | May 15, 1934 |
| 2,234,278 | Richter | Mar. 11, 1941 |
| 2,253,356 | Van den Akker | Aug. 19, 1941 |
| 2,255,034 | Bauer | Sept. 2, 1941 |
| 2,294,876 | Walker | Sept. 1, 1942 |
| 2,388,842 | Hanson | Nov. 13, 1945 |
| 2,442,506 | Morris | June 1, 1948 |
| 2,461,464 | Aronstein | Feb. 8, 1949 |